United States Patent
Reeser

(10) Patent No.: US 11,394,600 B2
(45) Date of Patent: *Jul. 19, 2022

(54) SERVICE-LEVEL RESILIENCY IN VIRTUALIZATION ENVIRONMENTS

(71) Applicant: AT&T Intellectual Property I, L.P., Atlanta, GA (US)

(72) Inventor: Paul Reeser, Red Bank, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,206

(22) Filed: Aug. 24, 2020

(65) Prior Publication Data

US 2020/0389349 A1 Dec. 10, 2020

Related U.S. Application Data

(63) Continuation of application No. 15/973,112, filed on May 7, 2018, now Pat. No. 10,785,089.

(51) Int. Cl.
| | | |
|---|---|---|
| *H04L 29/08* | (2006.01) | |
| *H04L 41/06* | (2022.01) | |
| *G06F 9/455* | (2018.01) | |
| *H04L 41/14* | (2022.01) | |

(52) U.S. Cl.
CPC .......... *H04L 41/06* (2013.01); *G06F 9/45558* (2013.01); *H04L 41/14* (2013.01); *G06F 2009/45591* (2013.01); *G06F 2009/45595* (2013.01)

(58) Field of Classification Search
CPC .............................. H04L 41/06; H04L 41/14
See application file for complete search history.

(56) References Cited

U.S. PATENT DOCUMENTS

| | | | |
|---|---|---|---|
| 6,112,236 A | 8/2000 | Dollin et al. | |
| 8,423,630 B2 | 4/2013 | Ciscon et al. | |
| 8,612,599 B2 | 12/2013 | Tung et al. | |
| 8,635,606 B2 * | 1/2014 | Kruglick | G06F 8/443 717/153 |
| 8,719,623 B2 | 5/2014 | Biran et al. | |
| 9,069,730 B2 | 6/2015 | Talwar et al. | |
| 9,288,689 B2 * | 3/2016 | Lee | H04W 24/00 |
| 9,294,363 B2 | 3/2016 | de Assuncao et al. | |

(Continued)

FOREIGN PATENT DOCUMENTS

| | | |
|---|---|---|
| WO | WO 2017/189015 A1 | 11/2017 |
| WO | WO 2017/209988 A1 | 12/2017 |

OTHER PUBLICATIONS

"Requirement Handbook Releases"; http://www.ti9000.orq/handbooks/requirements_handbook.html; TL9000; accessed Aug. 24, 2018; Dec. 2017; 2 pages.

(Continued)

*Primary Examiner* — Adnan M Mirza
(74) *Attorney, Agent, or Firm* — Guntin & Gust, PLC; Mark Wilinski

(57) ABSTRACT

A set of service-level reliability metrics and a method to allocate these metrics to the layers of the service delivery platform. These initial targets can be tuned during service design and delivery, and feed the vendor requirements (Continued)

process, forming the basis for measuring, tracking, and responding based on the service-level reliability metrics.

20 Claims, 8 Drawing Sheets

(56) References Cited

U.S. PATENT DOCUMENTS

| | | | |
|---|---|---|---|
| 9,300,548 | B2 | 3/2016 | Asthana et al. |
| 9,356,883 | B1 | 5/2016 | Borthakur |
| 9,391,855 | B2 | 7/2016 | Mouline et al. |
| 9,411,622 | B2 | 8/2016 | Zhu et al. |
| 9,465,641 | B2 | 10/2016 | Ryu et al. |
| 9,509,524 | B2 | 11/2016 | Lewis |
| 9,853,914 | B1 | 12/2017 | Felstaine et al. |
| 9,882,833 | B2 | 1/2018 | McBride et al. |
| 9,892,007 | B2 | 2/2018 | Yang et al. |
| 2013/0145367 | A1 | 6/2013 | Moss et al. |
| 2014/0095691 | A1 | 4/2014 | Ganguli et al. |
| 2015/0156081 | A1 | 6/2015 | Chakra et al. |
| 2015/0319050 | A1 | 11/2015 | Kasturi et al. |
| 2016/0218914 | A1 | 7/2016 | Astigarraga et al. |
| 2017/0250892 | A1 | 8/2017 | Cooper et al. |

OTHER PUBLICATIONS

Cotroneo et al.; "Dependability Evaluation and Benchmarking of Network Function Virtualization Infrastructures" IEEE Conf. Network Softwarization (NetSoft); 2015; 9 pages.

Sterbenz et al.; "Evaluation of Network Resilience, Survivability, and Disruption Tolerance: Analysis, Topology Generation, Simulation, and Experimentation"; Telecommunication Systems; 2013; 34 pages.

"Ensuring high-availability and resiliency for NFV"; Cobham Wireless and Stratus Technologies; White Paper; Jan. 2016; 12 pages.

Fischer et al.; "Overview on Methodology and Tools for Resilient Services"; ICT—Information and Communication Technologies; 2013; 59 pages.

Gupta et al.; "Fault and Performance Management in Multi-Cloud Based NFV using Shallow and Deep Predictive Structures"; Journal of Reliable Intelligent Environments; 2017; vol. 3 No. 4; Dec. 2017; p. 221-231.

"Network Functions Virtualisation (NFV); Assurance; Report on Active Monitoring and Failure Detection"; ETSI; Ref. DGS/NFV-REL004; Apr. 2016; 61 pages.

P. Reeser; "Allocating Sevice-Level Reliability Metrics to SW and HW Vendors in NFV Environments"; AT&T Labs Research; 6 pages.

* cited by examiner

SERVICE-LEVEL RESILIENCY IN VIRTUALIZATION ENVIRONMENTS

CROSS REFERENCE TO RELATED APPLICATIONS

This application is a continuation of, and claims priority to, U.S. patent application Ser. No. 15/973,112, filed May 7, 2018, entitled "Service-Level Resiliency In Virtualization Environments," the entire contents of which are hereby incorporated herein by reference.

BACKGROUND

Traditional, pre-virtualization approaches to assessing network function reliability (QuEST Forum, TL 9000 requirements handbook release 6.0, 2016. http://www.tl9000.org/handbooks/requirements_handbook.html) rely on the ability to measure reliability at the physical network element (NE) level. And service reliability indicators such as availability and defects are computed in a bottom-up manner, taking into account hardware (HW) failure and repair rates normalized per NE and counts of NEs in service. Consequently, the resulting availability and defect metrics often represent a myopic HW-centric view, rather than a holistic service-oriented perspective. There is a comprehensive history of concepts of service reliability and the evolution of transactional metrics that have not been properly constructed for real world scenarios.

SUMMARY

Virtualization, combined with the deployment of applications on cloud platforms, introduces a new dimension to the vendor requirements management process. With the ability to separate software from hardware (and select different vendors for each) comes the need to allocate reliability requirements between these layers in a multi-vendor virtualized environment. Disclosed herein is a set of service-level reliability metrics and a method to allocate these metrics to the layers of the service delivery platform. These initial targets can be tuned during service design and delivery, and feed the vendor requirements process, forming the basis for measuring, tracking, and responding based on the service-level reliability metrics.

In an example, an apparatus may include a processor and a memory coupled with the processor that effectuates operations. The operations may include obtaining one or more messages, the one more messages comprising a response time threshold associated with a virtual machine; based on the one or more messages, determining service-level time between outages associated with a virtual machine; based on the service-level time, determining the time between virtual machine outage incidents; and sending an alert when the time between virtual machine outage incidents are above a threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
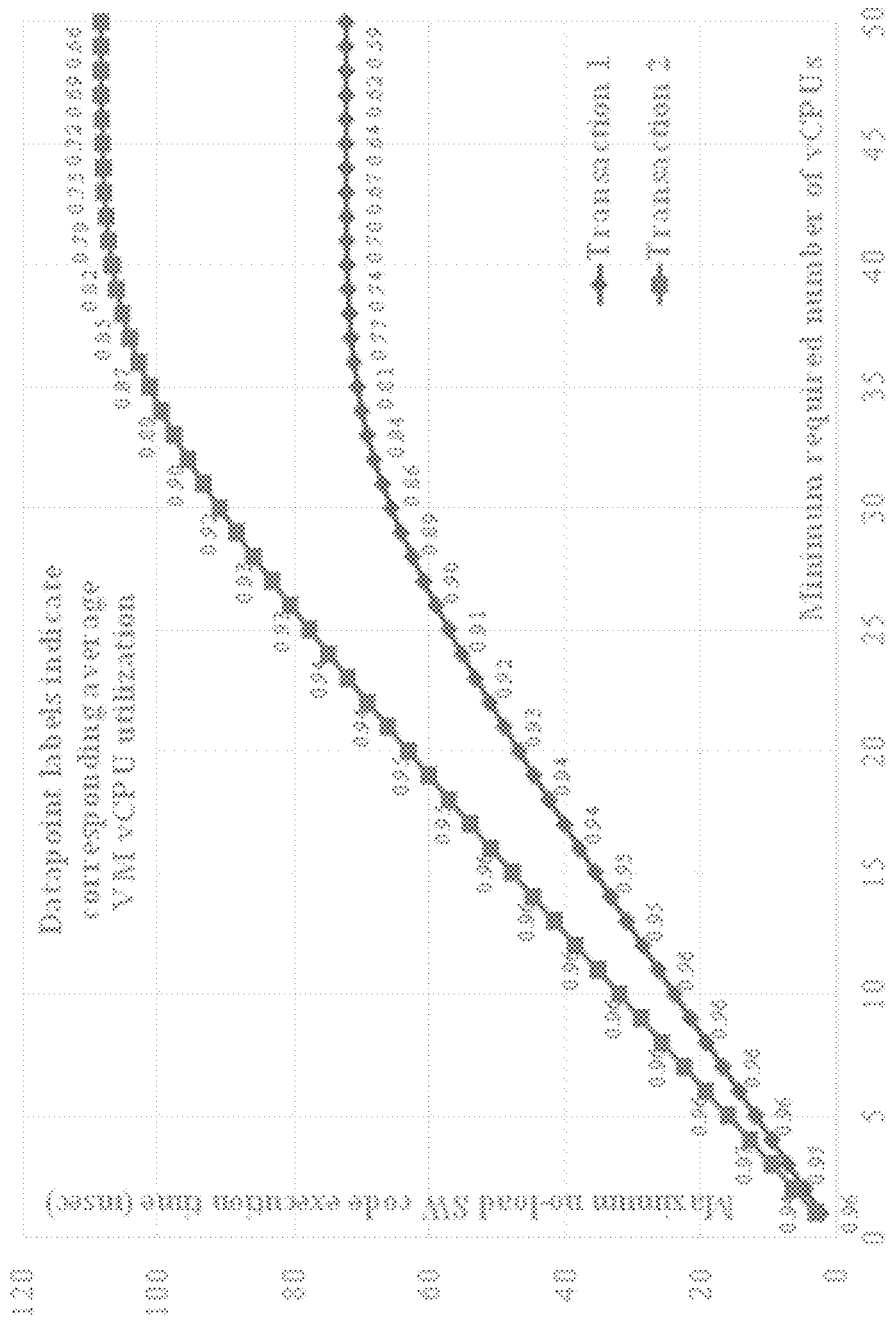
FIG. 1 shows the feasible solution pairs $\{N, T^{\circ}\}$ that meet the Performability metric P.

The introduction of Network Function Virtualization (NFV), combined with the deployment of network functions on cloud-based platforms, has a disruptive impact on this traditional methodology. Now, failure of an individual HW element may have little or no detectability associated with service availability, since virtualized network functions (VNFs) can be quickly (even automatically) restarted on spare cloud HW. Thus, NFV is leading to significant changes in the way traditional vendor reliability requirements are defined, measured, monitored, and enforced. Some metrics that made sense in the traditional monolithic environment no longer apply, while others need to be redefined or renormalized to apply to a VNF environment.

This need to retool traditional approaches to computing service reliability metrics provides an opportunity to address their inherent deficiencies by defining metrics from a service-oriented perspective. The keys to this transition lie in thinking about defects in terms of impacted transactions, rather than simply minutes of unavailability, and broadening the scope of definition of defects to include significantly more areas of customer impact, rather than simply unavailability, since service-impacting transaction defects can result from outages and blocking (accessibility), loss (continuity), and delay (performability).

If this were not challenge enough, these changes represent adjustments to an already established framework for vendor requirements management. However, virtualization introduces an entirely new element to the process. With the ability to separate software (SW) from HW (and select different vendors for each) comes the need to rationally partition the service-level reliability metrics between the layers of separation and their associated vendors. Clearly defined boundaries between vendor requirements will be paramount to successful service-level agreement (SLA) management and enforcement in the multi-vendor environment NFV creates.

Objectives of this work may include: 1) leverage the virtualization paradigm shift to define a comprehensive set of service-level reliability metrics that more realistically capture customer experience, while at the same time preserving as much of the traditional approach as possible; and 2) propose a methodology to allocate the service-oriented requirements to the components of the service delivery platform, thus providing a rational way to set initial targets that can be monitored and tuned during the service design and delivery process. The default demarcation point is the interface between the SW vendor's virtual machine (VM=application SW+guest OS) and HW vendor's NFV infrastructure (NFVi=hypervisor+native OS+host HW).

The inputs to this methodology are the service-oriented availability/accessibility, continuity, and performability (ACP) requirements and service workload profile (transaction arrival rates and response time thresholds). The outputs are each vendor's component requirements: SW and HW mean times between failure (MTBF) and mean times to restore (MTTR), baseline (no-load) SW code execution times, and minimum guaranteed HW processing allocations. The proposed approach provides a rational way to set the initial overall service-level MTBF and MTTR targets, as well as a rational way to set the initial individual SW and HW vendor-level component metrics.

Disclosed below is terminology for reliability metrics, such as availability, accessibility, continuity, and performability, among others. Availability and accessibility are distinct but related. Availability may be considered the proportion of user-perceived service uptime, measured as total uptime over total time; legacy time-based probability that the service is available. Accessibility may be considered the proportion of successfully initiated transactions, measured as total successfully established over total transactions; that is, the probability that the service is accessible (e.g., the transaction attempt is not blocked). Time-based availability is agnostic to transaction workload profile and time-of-day variations. If the traffic rate is constant over time (unlikely), then availability and accessibility are equivalent. However, the transaction-based accessibility metric should be met even during peak traffic periods. For simplicity, we assume that the accessibility metric is more constraining, and do not further consider a legacy availability metric per se.

Continuity may be considered the proportion of successfully completed transactions, measured as total successfully completed over total transactions; that is, the probability of service continuity (e.g., the transaction in progress is not lost or dropped). Performability may be considered the proportion of transactions completed within response time thresholds, measured as total completed within threshold over total transactions; that is, the probability of timely service fulfillment. A transaction may belong to one of four defect categories: blocked (Accessibility defect), lost (Continuity), delayed (Performability), and fulfilled (no Accessibility, Continuity, and Performability (ACP) reliability defect). A separate transaction defects per million (DPM) metric is redundant, since the total service-level defects are given by the sum of the ACP defects. The mapping of ACP metrics to DPMs will not be addressed further.

Additional terminology may include transaction arrival rate, transaction response time, mean time between failure, no-load transaction execution time, or dedicated production-equivalent vCPUs. Transaction arrival rate may be considered the frequency (e.g., in transactions per second) averaged over a typical busy period (e.g., day). Transaction response time may be considered the threshold (e.g., in seconds) below which the transaction is considered to be timely fulfilled (e.g., to avoid timeout). Mean time between failure (MTBF) may be considered the expected time between consecutive unplanned service-impacting outages. Mean time to restore (MTTR) is the expected time to restore service following a service-impacting incident. MTBF and MTTR should be allocated to both the VM SW and NFVi HW. No-load transaction execution time may be considered response time when the VM SW is executed in a production environment; SW vendor's transaction performance requirements. Dedicated production-equivalent vCPUs may be considered the HW vendor's minimum guaranteed vCPU allocation requirements.

The disclosed analysis approach can be described in the context of the above metrics. The Accessibility and Continuity metrics, e.g., together with the transaction arrival rates, may drive the SW and HW MTBFs and MTTRs for outages. The Performability metric, e.g., together with the transaction arrival rates and response time thresholds, may drive the no-load transaction SW execution times and the minimum guaranteed HW CPU allocations.

Let B, L, and P respectively denote the service-level Accessibility (Blocking), Continuity (Loss), and Performability (delay) requirements. (We use B instead of A for Accessibility, and L instead of C for Continuity, because A and C are more suitable for use elsewhere in the analysis.)

Let $\lambda_i$ (i=1, ..., K) denote the average transaction arrival rate (per second) for transaction i, and let $T_i$ denote the response time threshold (in seconds) for transaction i. Depending on the service, there may be a distinction between atomic transactions and user sessions. A session may include a sequence of transactions. ACP metrics could be specified for atomic transactions or user sessions. For the analysis to follow, without loss of generality (WLOG) it is assumed that ACP metrics are associated with atomic transactions.

Let a denote the average service-level impact of a failure. In any complex system, there are myriad possible HW and SW components that can fail, and the service-level impact of a failure varies greatly by failure type. For instance, the failure of a particular piece of replicated HW may have minimal impact at the service level, and the degree of impact may vary with the level of replication, whereas a fault in shared SW may have more widespread impacts at the service level. Furthermore, a particular failure may have different impacts on Accessibility, Continuity, and Performability. For example, front-end portal failure may result in 100% Accessibility loss, but have no impact on Continuity of transactions in progress.

For the analysis to follow, WLOG it is assumed that $\alpha$ represents the average service impact across failure types and on defect types. Field data can be collected to determine the appropriate range for $\alpha$, and if significant differences exist between defect types, then separate parameters can be used. For example, field data may suggest that failures fit a bimodal distribution, falling into two broad categories: those resulting in the outage of a single HW or SW element for which recovery is fast (a disk drive, a network interface card, a server OS reboot, etc) and those resulting in the outage of an entire data center for which recovery is lengthy (a core uplink fiber cut, a storage chassis, commercial power or air conditioning, etc). In this case, separate parameters can easily be defined for each category.

Disclosed below is service-level MTBF and MTTR. Let F denote the mean time between outages (MTBF, in hours), and let R denote the mean time to restore service following an outage (MTTR, in hours). F and R are the desired service-level outputs for MTBF and MTTR.

Consider the Accessibility metric. If any time of day (ToD) traffic variations are ignored, then the Accessibility requirement reduces to the familiar, legacy Availability-based constraint $B \le F/(F+\alpha R)$. If we include ToD impacts, then it can be shown that in the worst case $B \le F/(F+\alpha\sigma R)$, where $\sigma$ denotes the daily peak-to-average traffic ratio. Rearranging, the constraint imposed by the Accessibility requirement becomes $F \ge \alpha\sigma RB/(1-B)$.

Next, consider the Continuity metric. It can be shown that in the worst case the average number of Continuity defects per transaction is given by $\alpha\omega/F$, where $\omega = \Sigma\lambda_i T_i/(3600\Sigma\lambda_i)$ denotes the weighted average response time threshold (in hours). Thus, $\alpha\omega/F \le (1-L)$. Rearranging, the constraint imposed by the Continuity requirement becomes $F \ge \alpha\omega/(1-L)$.

Finally, combining these constraints, and assuming that in the worst case the inequality is tight, the relationship between F, R, and the input parameters is given by $$F = \alpha \max\{\sigma RB/(1-B), \omega/(1-L)\}. \quad (1)$$

Turning equation (1) into two intermediate output parameters (F, R) may require one assumption. In the pre-NFV environment, R denoted time to repair a physical network element (NE) following failure. As mentioned previously, the introduction of NFV and cloud based platforms provides the ability to restore service (perhaps seamlessly) following the failure of an individual element, since new VMs can be quickly restarted or migrated to spare HW. Failed HW can subsequently be repaired and later returned to the cloud resource pool. Thus, R may be much lower than classic pre-NFV repair times.

Nonetheless, these restoral times will be highly application dependent. In some instances, such as stateless Web servers running in a high-availability configuration, VMs can be migrated or restarted in O(seconds). In other instances, such as stateful IP routers with large routing tables, VMs may take O(minutes) to reload. In the catastrophic case of a VNF running in a single data center with no failover capability (or lengthy manual failover), it may take O(hours) to restore service following data center power failure or fabric isolation.

There are numerous possible approaches to turning this one equation into two intermediate output parameters F and R. For instance, we could assume that $R = f(\alpha)$; that is, the allowable restoral rate is driven by the magnitude of impact of outage incidents. Or, we could assume that $F = f(B)$; that is, the allowable failure frequency is driven by the required accessibility. In yet another approach (used in this analysis), we could assume that $R = f(B)$; that is, the allowable restoral rate is driven by the required accessibility. In particular, consider the relationship in Table 1. Each required '9' of Accessibility B halves the allowable R. Thus, $\log_{10}[10^6(1-B)] = \log_2(R/\varphi)$, where $\varphi$ denotes an application-aware scaling parameter. Rearranging, $R = \varphi 2^{[6+\log(1-B)]}$. We henceforth assume WLOG that if $B = 0.999999$, then service should be restored within $\varphi = 2^{-3}$ hours (7.5 minutes). Thus $$R = 2^{3+\log(1-B)}. \quad (2)$$

The proposed initial set of service-level MTBF and MTTR targets is given by (1)-(2). For example, if the Accessibility target $B = 0.9999$, Continuity target $L = 0.9995$, average outage impact $\alpha = 0.25$, weighted response time threshold $\omega = 0.61$ sec, and ToD traffic variability factor $\sigma = 1.5$, then $F = \max\{1875, 0\} = 1875$ hours (78 days) and $R = 30$ minutes.

TABLE I

RELATING ACCESSIBILITY AND MTTR

| Accessibility B | | MTTR R (in hours) |
|---|---|---|
| 0.999999 | (six 9s) | $\varphi$ |
| 0.99999 | (five 9s) | $2\varphi$ |
| 0.9999 | (four 9s) | $4\varphi$ |
| 0.999 | (three 9s) | $8\varphi$ |
| 0.99 | (two 9s) | $16\varphi$ |
| 0.9 | (one 9) | $32\varphi$ |

Another important implication of NFV not yet mentioned is the increased importance and added difficulty of fault detection and test coverage. Separating SW from HW and selecting different vendors creates further challenges, such as: How do we ensure that different vendors have robust detection mechanisms if the failures lie within the interaction between the layers? How do we minimize situations where one vendor deflects blame onto the other to avoid accountability? How do we ensure that test coverage is adequate? How do we set requirements that can be measured for compliance? From an analysis standpoint, we can include detection and coverage by replacing R by $R+(1-c)D$, where c is the coverage factor and D is the additional detection time due to an uncovered fault.

The input and output parameters discussed thus far are summarized in Table 2.

TABLE 2

INPUT AND OUTPUT PARAMETERS

| | Definition |
|---|---|
| Input Parameter | |
| B | Service-level Accessibility (blocking) requirement |
| L | Service-level Continuity (loss) requirement |
| P | Service-level performability (delay) requirement |
| $\lambda_i$ (i = 1, . . . , K) | Average transaction arrival rate (per second) for transaction i |
| $T_i$ (i = 1, . . . , K) | Response time threshold (in seconds) for transaction i |
| $\alpha$ | Average service-level impact of a failure |
| $\sigma$ | Daily peak-to-average traffic ratio |
| $\omega = \Sigma\lambda_i T_i/\Sigma\lambda_i$ | Weighted average response time threshold (in seconds) |
| $\varphi$ | Application-aware scaling parameter |
| Output Parameter | |
| F | Service-level mean time between outages (MTBF, in hours) |
| R | Service-level mean time to restore service (MTTR, in hours) |

Vendor-Level Allocation—Vendor-Level MTBFs and MTTRs. Now that the initial service-level MTBF and MTTR targets have been specified, F and R need to be apportioned to the respective VM and NFVi vendors. For the analysis to follow, let $A = F/(F+\alpha R)$ denote the expected time-based availability derived from service-level targets F and R. Rearranging this equation for the time-based availability yields several useful expressions: $F = \alpha RA/(1-A)$ and $\alpha R/F = (1-A)/A$.

Let $A_S$ and $A_H$ denote the VM SW and NFVi HW time-based availabilities, respectively. Let $F_S$ and $F_H$ denote the mean time between VM and NFVi outage incidents, respectively. Let $R_S$ and $R_H$ denote the mean time to restore service following VM and NFVi outage, respectively. Finally, let $\alpha_S$ and $\alpha_H$ denote the average service impact of VM and NFVi outage incidents, respectively. Then the following familiar equations express the standard time-based relationship between A, F, and R:

$$A_S = F_S/(F_S + \alpha_S R_S) \text{ and } A_H = F_H/(F_H + \alpha_H R_H). \quad (3)$$

Next, the following key relationships hold:

outage rate $1/F = 1/F_S + 1/F_H$, (4)

outage impact $\alpha/F = \alpha_S/F_S + \alpha_H/F_H$, and (5)

outage load $\alpha R/F = \alpha_S R_S/F_S + \alpha_H R_H/F_H$. (6)

First, (4) states that the total outage rate 1/F is the sum of the SW and HW outage rates. Next, (5) states that the total outage 'impact' rate α/F is the sum of the SW and HW outage impact rates. Finally, (6) states that the total outage 'load' αR/F is the sum of the SW and HW outage loads, where 'load' (in Erlangs) is an additive measure of utilization.

In practice, one or more of the parameters ($F_S$, $R_S$, $F_H$, $R_H$) can be directly specified (e.g., based on application VNF or cloud NFVi knowledge). For example, MTT restart a VM following a SW fault, or MTT restore all VMs following a HW failure, could be well known. In fact, the typical scenario may entail the deployment of a new VNF in a mature cloud environment. In this case, ($F_H$, $R_H$, $\alpha_H$) are known based on extensive history operating the NFVi cloud environment, and (4)-(6) directly yield the remaining outputs ($F_S$, $R_S$, $\alpha_S$).

In lieu of any such historical VNF or NFVi information, a number of additional assumptions are required. Unfortunately, one of the four equations (3)-(6) is redundant, so turning three input parameters (F, R, α) into six output parameters ($F_S$, $R_S$, $\alpha_S$, $F_H$, $R_H$, $\alpha_H$) necessarily requires three assumptions. In other words, from a mathematical perspective—there is not a single solution to these equations. There are many sets of the 6 output variables that satisfy these equations, so additional constraints (the tunable parameters) should be introduced.

Expressions (4)-(6) provide the basis for the three natural assumptions. Outage rate, impact, and load capture different dimensions of outage intensity. Outage rate 1/F captures the relative volume of outages, outage impact α/F captures the relative severity of outages, and outage load αR/F captures the relative proportion of time in failure state. Furthermore, each outage dimension is additive across HW and SW. As such, each expression can be conveniently normalized to produce proportions respectively attributable to HW and SW, where both components are between 0 and 1 and sum to 1. These three normalized parameters each provide a 'sliding scale' with which the relative SW and HW allocations can be tuned.

First, let $\beta = (\alpha_S R_S/F_S)/(\alpha R/F)$ denote the proportion of total outage load αR/F attributable to the SW vendor (tunable). Then $A_S = F/(F + \alpha\beta R)$ and $A_H = F/(F + \alpha\beta' R)$, where $\beta' = 1 - \beta$. Thus $A_S$ and $A_H$ are expressed entirely as functions of the input parameters. Rearranging yields several useful expressions: $A_S/(1-A_S) = F/(\alpha\beta R)$ and $A_H/(1-A_H) = F/(\alpha\beta' R)$. Substituting, (5) provides a direct relationship between $R_H$ and $R_S$, namely $$1/R = \beta/R_S + \beta'/R_H. \quad (7)$$

Next, let $\delta = (\alpha_S/F_S)/(\alpha/F)$ denote the proportion of total outage impact α/F attributable to the SW vendor (tunable). Substituting, (3) and (7) yield $R_S = R\beta/\delta$ and $R_H = R\beta'/\delta'$, where $\delta' = 1 - \delta$. Thus, $R_S$ and $R_H$ are expressed entirely as functions of the input parameters.

Finally, let $\gamma = F/F_S$ denote the proportion of total outage rate $F^{-1}$ attributable to the SW vendor (tunable). Then $F_S = F/\gamma$ and $F_H = F/\gamma'$, where $\gamma' = 1 - \gamma$. Thus, $F_S$ and $F_H$ are expressed entirely as functions of the input parameters. From this, (5) provides a direct relationship between $\alpha_S$ and $\alpha_H$, namely $$\alpha = \gamma\alpha_S + \gamma'\alpha_H. \quad (8)$$

Since $\alpha_S = \alpha\delta F_S/F$, then $\alpha_S = \alpha\delta/\gamma$ and $\alpha_H = \alpha\delta'/\gamma'$. Thus $\alpha_S$ and $\alpha_H$ are expressed entirely as functions of the input parameters.

In summary, given the service-level metrics F, R, and α, and the proportions γ, δ, and β of outage rate 1/F, outage impact α/F, and outage load αR/F (respectively) attributable to SW vendor, the proposed initial set of vendor-level MTBF, MTTR, and service impact targets is given by $$F_S = F/\gamma, R_S = R\beta/\delta, \alpha_S = \alpha\delta/\gamma, \quad (9)$$

$$F_H = F/\gamma', R_H = R\beta'/\delta', \alpha_H = \alpha\delta'/\gamma' \quad (10).$$

The parameters (γ, δ, β) provide the ability to tune the allocation of reliability allotments between the SW and HW vendors. For example, if F=1875 hours, R=30 minutes, and α=0.25 (as before), and if the SW outage rate γ=0.8, impact δ=0.5, and load β=0.2, then $F_S$=2344 hours (98 days), $R_S$=12 minutes, $F_H$=9374 hours (391 days), and $R_H$=48 minutes. Tuning the parameters changes the allocations. For instance, if this resulting value for $R_H$ seems too aggressive based on cloud platform experience, then δ can be increased and/or β can be reduced to increase the HW restoral allocation (at the obvious expense of decreasing the SW restoral target).

The additional tunable and output parameters discussed are summarized in Table 3.

TABLE 3

TUNABLE AND OUTPUT PARAMETERS (CONTINUED)

| | Definition |
|---|---|
| Tunable Parameter | |
| β | Proportion of total outage load αR/F attributable to the SW vendor |
| δ | Proportion of total outage impact α/F attributable to the SW vendor |
| γ | Proportion of total outage rate 1/F attributable to the SW vendor |
| Output Parameter | |
| A | Expected time-based availability derived from service-level targets |
| $A_S$ and $A_H$ | VM SW and NFVi HW time-based availabilities, respectively |
| $F_S$ and $F_H$ | Mean time between VM and NFVi outage incidents, respectively |
| $R_S$ and $R_H$ | Mean time to restore service after VM and NFVi outages, respectively |
| $\alpha_S$ and $\alpha_H$ | Average service impact of VM and NFVi outage incident, respectively |

SW Efficiency and HW Guarantees. Let $\tau_i$ (i=1, . . . , K) denote the average response time (in seconds) for transaction i. Let $T_1^0$ denote the no-load SW code execution time for transaction i (in seconds) when the VM runs on a production-equivalent reference NFVi configuration. These are the SW vendor's transaction performance requirements. Let $N_i$ denote the number of dedicated production-equivalent VM vCPUs for transaction i (that is, vCPU cycles in seconds per sec). These are the HW vendor's minimum guaranteed VM vCPU allocation requirements. Finally, let $\tau_i$ denote the average utilization level for the $N_i$ vCPUs serving transaction i, where $\rho_i = \lambda_i T_i^0/N_i$. In the analysis to follow, the subscript i is ignored for simplicity.

First, consider the Performability metric P. We assume that the transaction arrival process~Poisson($\lambda$) and the transaction service time~exponential($T^o$), and we assume no blocking (e.g., Erlang delay model). Then the probability that transaction response time H exceeds threshold T is given by $Pr\{H>T\}=(1-\psi)e^{-T/T^o}+\psi e^{-N(1-\rho)T/T^o}$, where $\psi=\pi/[1-N(1-\rho)]$ and $\pi=Pr\{queueing\}$ is an explicit (but complicated) function of $\rho$ and N. However, it can be easily shown that $Pr\{H>T\}$ is well-approximated by assuming that the response time H~exponential($\rho$). Then $Pr\{H>T\}\approx e^{-T/\tau}\leq 1-P$ so $\tau\leq -T/\ln(1-P)$.

In this Erlang delay model, the expected response time $\tau=T^o(N-\lambda T^o+\pi)/N-\lambda T^o)$. This expression provides an explicit relationship between the SW code execution times $T^o$ and the HW CPU allocations N. Furthermore, this expression is monotonically increasing in $T^o$ for fixed N and $\rho<1$. Thus, we can compute a maximum value of $T^o$ for every value of N by starting with $T^o=0$ and increasing $T^o$ until the inequality $\tau\leq -T/\ln(1-P)$ is violated. The example results to follow are computed based on these exact expressions. However, it can be shown that $\tau$ is reasonably approximated by $$\tau \approx T^o/(1-\rho^N) \quad (11).$$

The resulting solution pairs $\{N, T^o\}$ exactly meet the Performability metric P. Furthermore, each pair results in a different utilization level $\rho$. The 'optimal' solution could be the minimum N that results in the maximum utilization level $\rho$ the HW vendor can commit to provide, or the minimum code execution time $T^o$ the SW vendor can commit to meet. Thus, the expression $T^o(N-\lambda T^o+\pi)/(N-\lambda T^o)\leq -T/\ln(1-P)$ explicitly quantifies the tradeoff between SW code execution times and the HW CPU allocations, and their relationship to T and P.

For example, let K=2 transaction types, arrival rates $\lambda_1=400/\text{sec}$ and $\lambda_2=300/\text{sec}$, and response time thresholds $T_1=0.50$ sec and $T_2=0.75$ sec. These transaction types, arrival rates, and response time thresholds are part of the specified by the service provider as part of the service description. Then average response times (as determined by formulas in the algorithm) can be no more than $\tau_1=72$ ms and $\tau_2=109$ ms in order for each transaction to meet the Performability metric P$\geq$0.999. FIG. 1, which is not necessarily drawn to scale, shows the feasible solution pairs $\{N, T^o\}$ that exactly meet the Performability metric P. Several valuable observations can be gleaned from this chart. First, there is an obvious tradeoff between the maximum allowable transaction SW execution time $T^o$ and the minimum required HW vCPU allocation N. The required HW allocation increases (initially roughly linearly) as the SW execution time increases. That is, if the SW vendor cannot meet a particular execution time target, then more HW resources are required. Second, the curve flattens beyond a certain HW allocation. That is, deploying additional HW resources eventually provides diminishing returns in terms of alleviating pressure on the SW vendor to meet code execution time objectives. Third, the utilization level decreases as the HW resource level increases. That is, as more HW resources must be deployed, the less efficiently those resources can be utilized. The 'knee' of each curve occurs around $\{T^o, N\}=\{68$ ms, $32\}$ for transaction 1 and $\{104$ ms, $37\}$ for transaction 2. In both cases, $\rho=85\%$.

The preceding analysis assumes unlimited queueing (M|M|N|$\infty$Erlang delay model). In reality, the application may have limited buffering available to queue requests (e.g., the TCP listen queue associated with the process). In this case, an M($\lambda$)|M($T^o$)|N|Q model can be used, and the Accessibility metric B will further constrain the value of $T^o$ for each N. In this scenario, $Pr\{blocking\}=\rho^Q/G\leq 1-B$, where normalization constant $G=E(N,\lambda T^o)^{-1}+\rho(1-\rho^Q)/(1-\rho)$ and E(s,a) is the Erlang B formula [5]. This inequality can easily be solved recursively starting with N=1 and incrementing by 1, using the equation E(s,a)=aE(s−1,a)/[s+aE(s−1,a)], where E(0,a)=1.

Finally, note that there are no tunable inputs to the computation of the SW code execution times $T^o$ or HW CPU allocations N. Thus, the allocation of P (and B if applicable) to $T^o$ and N is insensitive to any of the tunable parameters.

The additional output parameters discussed are summarized in Table 4.

TABLE 4

| OUTPUT PARAMETERS (CONTINUED) | |
|---|---|
| Output Parameter | Definition |
| $\tau_i$ (i = 1, . . . , K) | Average response time (in seconds) for transaction i |
| $T_i^o$ (i = 1, . . . , K) | No-load SW code execution time for transaction i (in seconds) |
| $N_i$ (i = 1, . . . , K) | Number of dedicated VM vCPUs for transaction i |
| $\rho_i$ (i = 1, . . . , K) | Average utilization level for the $N_i$ vCPUs serving transaction i |

Figure 2:
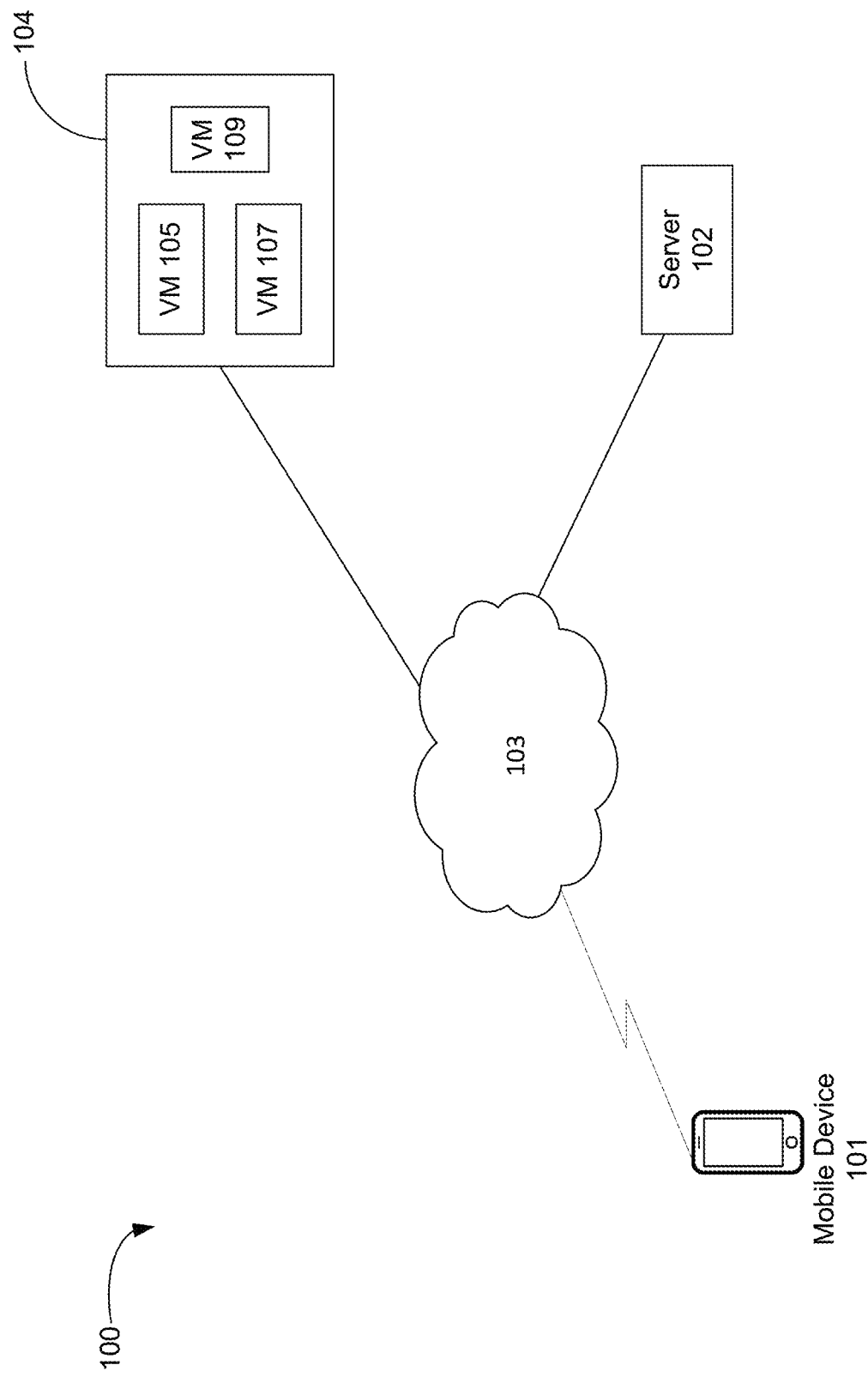
FIG. 2 illustrates an exemplary system that may implement service-reliability metrics for software or hardware.

FIG. 2 illustrates an exemplary system that may implement service-reliability metrics for software or hardware, as disclosed herein. System 100 includes mobile device 101, server 102, and server 104 that may be communicatively connected via network 103. Server 104 may include virtual machines, such as virtual machine (VM) 105, virtual machine 107, or virtual machine 109. Each device in system 100 may be communicatively connected with each other. Server 102 may be used to obtain or receive alerts associated with performance of hardware of server 104 or software (e.g., VM 105, VM 107, or VM 109).

Figure 3:
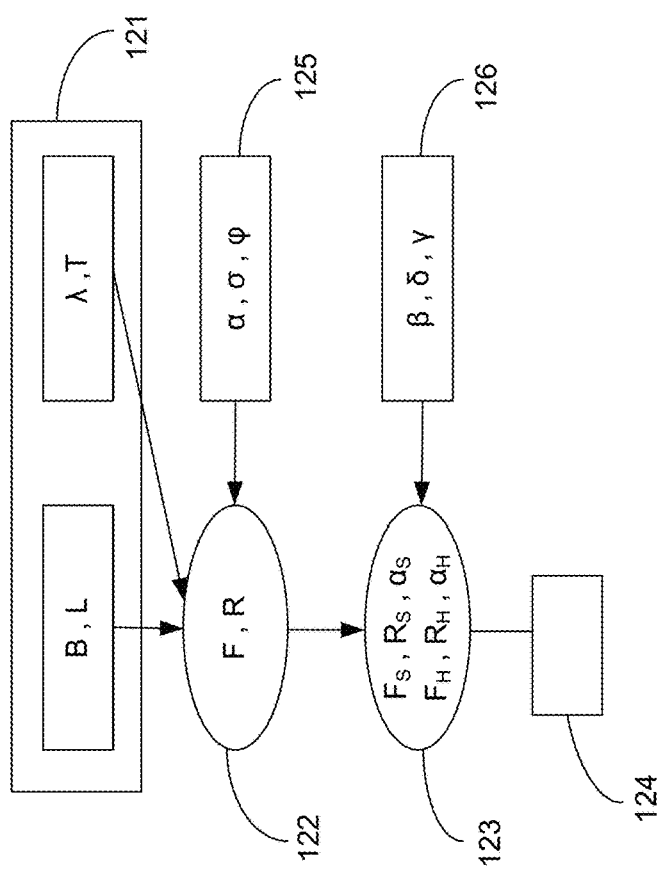
FIG. 3 illustrates an exemplary method for implementing service reliability for software or hardware.

FIG. 3 illustrates an exemplary method for implementing service reliability for software or hardware. In an exemplary scenario, a new implementation of software or hardware (e.g., server 104 and VM 105) may be planned for implementation into system 100. A network service provider may have initial requirements for VM 105 before it is implemented into system 100. At step 121, accessibility (e.g., blocking—B), continuity (e.g., Loss—L), average transaction arrival rate (e.g., $\lambda$), or transaction performance requirement (response time threshold) for VM 105 (e.g., T) may be obtained. B, L, T, and $\lambda$ may be pre-determined based on conditions associated with the network service to be implemented in VM 105 or more generally in system 100. For example, conditions may be based on considerations of FCC-reportable incident trends or other outage trends (e.g., for the service provider or other service providers) for a particular equipment or types of equipment. At step 122, based on one or more of the obtained metrics of step 121, F and R are the service-level mean time between failure and mean time to restore service, respectively, may be determined based on formulae (1) and (2). Tunable parameters (step 125) may also be provided as inputs for step 122. Step 122 is an approach to mapping the service-level requirements B and L into the service-level MTBF and MTTR metrics F and R.

At step 123, based on one or more of the obtained metrics of step 121 or step 122, $F_S$, $R_S$, $\alpha_S$, $F_H$, $R_H$, $\alpha_H$ may be determined based on formulae (9) and (10). Step 123 is an approach to mapping (allocating) the service-level MTBF and MTTR metrics F and R into the vendor-level metrics $F_S$, $R_S$, $\alpha_S$, $F_H$, $R_H$, and $\alpha_H$. In this process, three key tunable parameters are identified (step 126) that may be considered natural inputs to such an allocation methodology. These key parameters (e.g., the proportions of outage load, impact, and rate due to SW) can be initially specified during service development based on a database of past values for previous service instantiations and can be measured during deployment to tune the allocations.

At step 124, which may be subsequent to when $F_S$, $R_S$, $\alpha_S$, $F_H$, $R_H$, $\alpha_H$ are determined, a comparison is made to evaluate whether the metrics of step 122 or step 123 are within required or expected thresholds. If not within the required or expected thresholds, then an alert may be provided. The alert may include recommended changes to be made to hardware (e.g., CPUs) or software. For example, if the mean time between NFVi outage incidents $F_H$ is anticipated to be below (worse than) the allocation, then the mean time between VM outage incidents $F_S$ can be required to be increased through code resiliency improvements so that formulae (9) and (10) are again satisfied.

Figure 4:
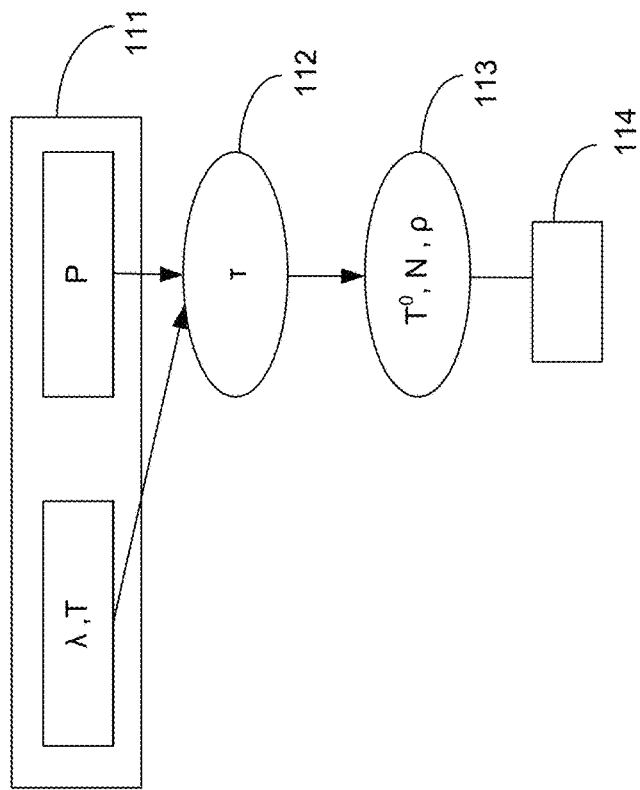
FIG. 4 illustrates another exemplary method for implementing service reliability for software or hardware.

FIG. 4 illustrates another exemplary method for implementing service reliability for software or hardware. In an exemplary scenario, a new implementation of software or hardware (e.g., server 104 and VM 107) may be planned for implementation into system 100. A network service provider may have initial requirements for VM 107 before it is implemented into system 100. At step 111, performability (e.g., delay—P), average transaction arrival rate (e.g., λ), or transaction performance requirement (response time threshold) for VM 107 (e.g., T) may be obtained. P, T, and λ may be pre-determined based on conditions associated with the network service to be implemented in VM 107 or more generally in system 100. Conditions may be based on previous metrics of VM's on server 104 (or the like servers), such as VM 105 or VM 109. In addition, conditions may be based on considerations of FCC-reportable incident trends or other outage trends (e.g., for the service provider or other service providers) for a particular equipment or types of equipment. At step 112, based on one or more of the obtained metrics of step 111, the expected response time for a transaction (τ) may be determined. The determining of τ may be based on formula (11). At step 113, based on one or more of the obtained metrics of step 111 or step 112, $T^0$, N, or τ may be determined. Step 113 is an approach to mapping the service-level requirement P into the vendor-level SW code execution times $T^0$ and numbers of dedicated VM vCPUs N.

At step 114, which may be subsequent to when τ, $T^0$, N, or τ are determined, a comparison is made to evaluate whether the metrics of step 112 or step 113 are within required or expected thresholds. If not within the required or expected thresholds, then an alert may be provided. The alert may include recommended changes to be made to hardware (e.g., CPUs) or software. For example, if the no-load SW code execution time $T^0$ is anticipated to be above the allocation, then the code execution time can be required to be reduced through code optimization, or the number of dedicated VM vCPUs N can be required to be increased.

Although the exemplary scenarios were based on a perspective associated with testing before a planned implementation, it is also contemplated that the system that implements service-reliability metrics for software or hardware may be implemented during production. For example, once a new VM is deployed into a production setting, software in system 100 may detect and collect the specific parameters to validate continuing adherence to the required metrics. The aforementioned disclosed processes may be iterative, particularly with tunable inputs as shown in block 125 and block 126 of FIG. 3. The methods of FIG. 4 or FIG. 3 may be implemented at approximately the same time and implemented on one device (e.g., mobile device 101, server 102, or server 104) or distributed over multiple devices (e.g., server 102, server 104, and mobile device 101). In addition, the conditions of step 121 and step 111 may be based further on the following. In an example, conditions may be based on reliability requirements offered by similar services (those that the service provider offered in the past, those of the service that this new service might be replacing, those that competitors are currently offering). In another example, conditions may be based on reliability requirements mandated by regulatory agencies with legal authority over a service offering. In another example, conditions may be based on historical trends associated with customer satisfaction with similar services, advertising or marketing claims by other service providers, results of independent measurement firms. Example advertising or marketing may include "Most Reliable Network" claims by as service provider an associated metric in the fine print of the ad, like 99.9% availability or 99.99% call completion rate or 0.01% dropped calls. In another example, conditions may be based on historical recorded metrics of similar or the same software or hardware. The historical metrics (e.g., VNF or NFVi, information associated with key performance indicators, etc.) may be an average or median over multiple days (e.g., holidays), weeks, or months.

FIG. 4 and FIG. 3 show the logical flow of inputs, tunable parameters, and outputs. B, L and P are the service-level Accessibility, Continuity, and Performability targets. In a simple example, we assume that B≥0.9999, L≥0.9995, P≥0.999, K=2 transaction types (e.g., retrieve and update record), average arrival rates $\lambda_1$=400/sec and $\lambda_2$=300/sec, and response time thresholds $T_1$=0.50 sec and $T_2$=0.75 sec. Then ω=0.61 sec. Let the ToD traffic variability factor σ=1.5, and let the service-specific restoral rate scalar φ=2e⁻3.

Tunable input α∈(0,1] is the average service impact of a failure. Tunable parameters β, δ, and γ are the proportions of outage load, impact, and rate (respectively) due to SW∈[0,1]. We initially assume that α=0.25, β=0.2, δ=0.5, and γ=0.8, and later explore sensitivities to these tunable parameters.

Outputs and Vendor Requirements for the example are disclosed below. F and R are the service-level mean time between failure and mean time to restore service, respectively. In this example, F=1875 hours (78 days) and R=30 minutes. The resulting service-level availability A=0.99993. The vendor allocation of the service availability A is $A_S$=0.99999 and $A_H$=0.99995. $F_S$ and $F_H$ are the mean times between VM and NFVi failures, respectively. $R_S$ and $R_H$ are the mean times to restore service following VM and NFVi outages. $\alpha_S$ and $\alpha_H$ are the average service impacts of a VM and NFVi outage incident. For the SW vendor, $F_S$=2344 hours (98 days), $R_S$=12 minutes, and $\alpha_S$=0.16. For the HW vendor, $F_H$=9374 hours (391 days), $R_H$=48 minutes, and $\alpha_H$=0.63.

$T_i^0$ is the no-load response time for transaction i when the VM runs on a reference NFVi lab configuration. $N_i$ is the number of dedicated production-equivalent vCPUs for transaction i (minimum guaranteed HW allocations). $\rho_i$ is the average utilization level of the $N_i$ vCPUs running transaction i. In this example, the average response times $\tau_i$=72 ms and $\rho_2$=109 ms, the (maximum) no-load transaction SW execution time requirements $T_1^0$=38 ms and $T_2^0$=55 ms, and the (minimum) required HW CPU allocations $N_1=32$ and $N_2=34$, with resulting utilization levels $\rho_1=48\%$ and $\rho_2=49\%$.

Average Service Impact of Outage Incidents ($\alpha$) are disclosed below. The average service impact of an outage $\alpha$ may be said to have no effect on the overall MTTR R or its allocation to SW and HW, but it has significant impact on the service- and vendor-level MTBFs. F, $F_S$, and $F_H$ are all linearly proportional to $\alpha$. The larger the outage impact, the longer the time must be between outages in order to meet the service- and vendor-level metrics. Resilient SW design principles, together with cloud HW redundancy, should be leveraged to keep $\alpha$ as close to 0 as possible ($\pm 0.2$).

Figure 5:
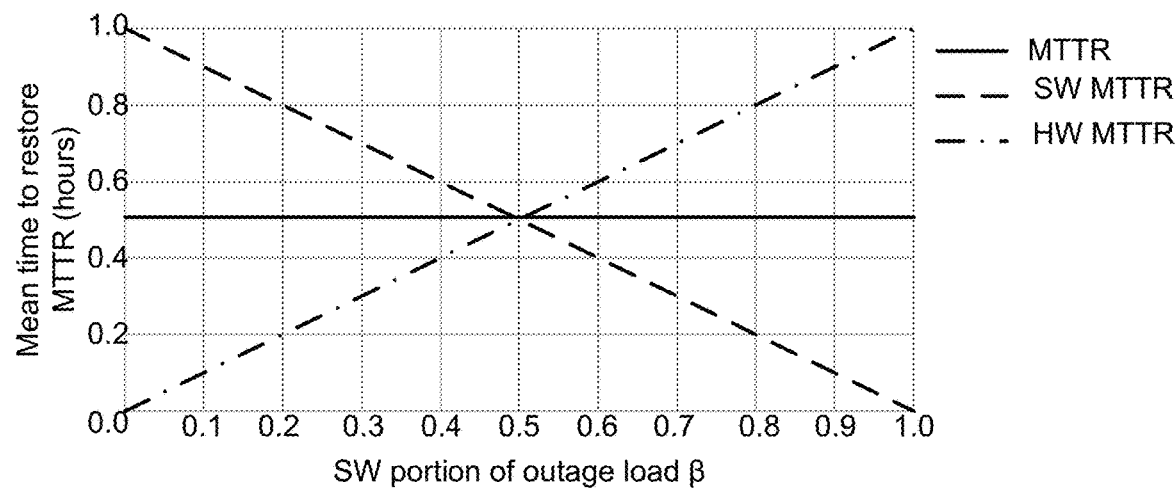
FIG. 5, which is not necessarily drawn to scale, illustrates an exemplary graph of sensitivity to proportion of outage load attributable to SW.

Proportion of Outage Load Attributable to SW ($\beta$) are disclosed below. The proportion of outage load due to SW $\beta$ has no effect on F or its allocation to SW and HW, and no effect on R, but it may have significant impact on the allocation of R to SW and HW. As shown in FIG. 5, $R_S$ and $R_H$ are linearly proportional to $\beta$ and $\beta'$, respectively. The larger the proportion of outage load due to SW, the longer the time allocated to restore service following SW faults, but the shorter the time allocated to restore following HW failures. Since HW outages are likely to take significantly longer to restore than SW outages, $\beta$ should be kept much closer to 0 than to 1 ($\pm 0.2$).

Figure 6:
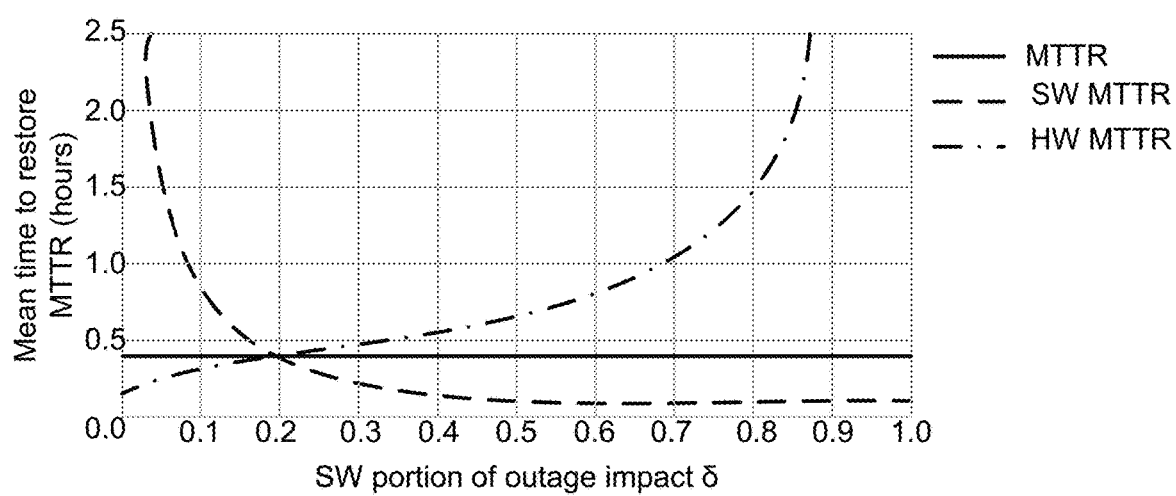
FIG. 6, which is not necessarily drawn to scale, illustrates an exemplary graph of sensitivity to proportion of outage impact attributable to SW.

The proportion of outage impact due to SW $\delta$ may be said to have no effect on MTBF F or its allocation, and no effect on MTTR R, but it may have significant impact on the allocation of R to SW and HW. As shown in FIG. 6, $R_S$ is inversely proportional to $\delta$ while $R_H$ is inversely proportional to $\delta'$. For $\delta$ close to 0 (e.g., when most of the outage impact is due to HW), $R_H$ becomes extremely low (20 minutes), and for $\delta$ close to 1, $R_S$ becomes extremely low (5 minutes). At either extreme, challenges to meet the maximum restoral times pose substantial risks. Since HW outages are likely to take significantly longer to restore than SW outages, $\delta$ should be kept closer to 0 than to 1 ($\pm 0.4$) so that neither low HW nor SW MTTRs become problematic.

Figure 7:
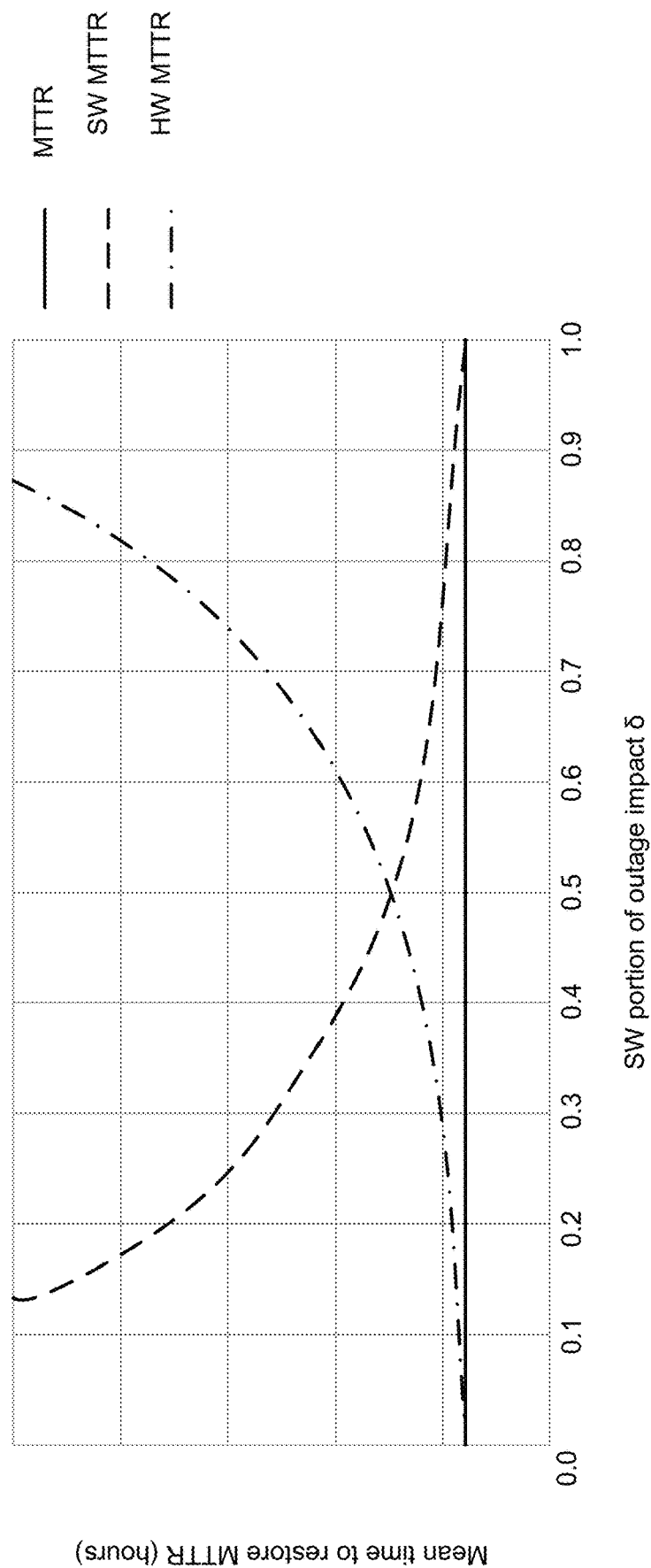
FIG. 7, which is not necessarily drawn to scale, illustrates an exemplary graph of sensitivity to proportion of outage rate attributable to SW.

The proportion of outage rate due to SW $\gamma$ may be said to have no effect on MTTR R or its allocation, and no effect on MTBF F, but it may have significant impact on the allocation of F. As shown in FIG. 7, $F_S$ is inversely proportional to $\gamma$ and $F_H$ is inversely proportional to $\gamma'$. For $\gamma$ close to 0 (i.e., when most of the outages are due to HW), $F_S$ becomes extremely high (years), and for $\gamma$ close to 1, $F_H$ becomes extremely high (years). At either extreme, challenges to meet these minimum failure intervals pose substantial risks. Since SW failures are likely to be significantly more frequent than HW failures, $\gamma$ should be kept closer to 1 than to 0 ($\pm 0.7$), but not so close that high HW MTBF becomes problematic.

The introduction of virtualization and cloud deployment have exposed inadequacies in traditional reliability assessment methodologies, leading to the need for significant changes in the way vendor reliability requirements are defined. With the ability to separate SW from HW comes the need to rationally allocate reliability metrics between the layers of separation and associated vendors. At the same time, this paradigm shift provides an opportunity to define service-oriented metrics that more realistically capture the customer experience.

The disclosed methodology allocates these service-level requirements to the SW and HW components of the solution, thus providing a rational approach to set initial targets that can then be tuned during service delivery. The outputs of this methodology are the individual vendor's component requirements (SW and HW MTBFs and MTTRs, SW code execution times, and HW processing allocations). In the process, four key tunable parameters are identified that are natural inputs to such an allocation methodology. These key parameters (the average service-level impact of a failure, and the proportions of outage load, impact, and rate due to SW) can be measured during deployment to tune the allocations.

The initial targets can feed into the vendor requirements negotiation process, forming the basis for contractual service-level agreements to be measured and tracked over time. In the future, a repository of service-specific parameter values can be accumulated to further harden the practical ranges of values for the tunable parameters, thus facilitating better initial values for the vendor-level reliability metrics with each successive application of the methodology to new services.

The disclosed systems, methods, and apparatuses associated with service-level resiliency provide for several unconventional approaches. In a first example, there is an approach to mapping the service-level requirements B and L into the service-level MTBF and MTTR metrics F and R. In a second example, there is an approach to mapping (allocating) the service-level MTBF and MTTR metrics F and R into the vendor-level metrics $F_S$, $R_S$, $\alpha_S$, $F_H$, $R_H$, and $\alpha_H$. In a third example, there is an approach to mapping the service-level requirement P into the vendor-level SW code execution times $T^0$ and numbers of dedicated VM vCPUs N. Based on the aforementioned approaches, alerts may be sent to a device or automated changes may be made to HW (e.g., server 104, mobile device 101) or SW (e.g., VM 105, VM 107, VM 109) in order to restore to the determined thresholds (e.g., step 113 metrics, step 123 metrics, or step 124 metrics.

There are several things to takeaway from the disclosed subject matter associated with service-level resiliency. First, NFV and cloud based deployment are disrupting the traditional way industries measure and monitor reliability. Second, legacy approaches and their resulting metrics based on underlying NE availability are inadequate. Third, a paradigm shift toward service-oriented, transactional reliability metrics is significant. Fourth, new methodologies are needed to allocate service-level metrics between HW and SW layers of separation. Lastly, tunable parameters, as disclosed herein, may be natural inputs to any such allocation methodology.

Figure 8:
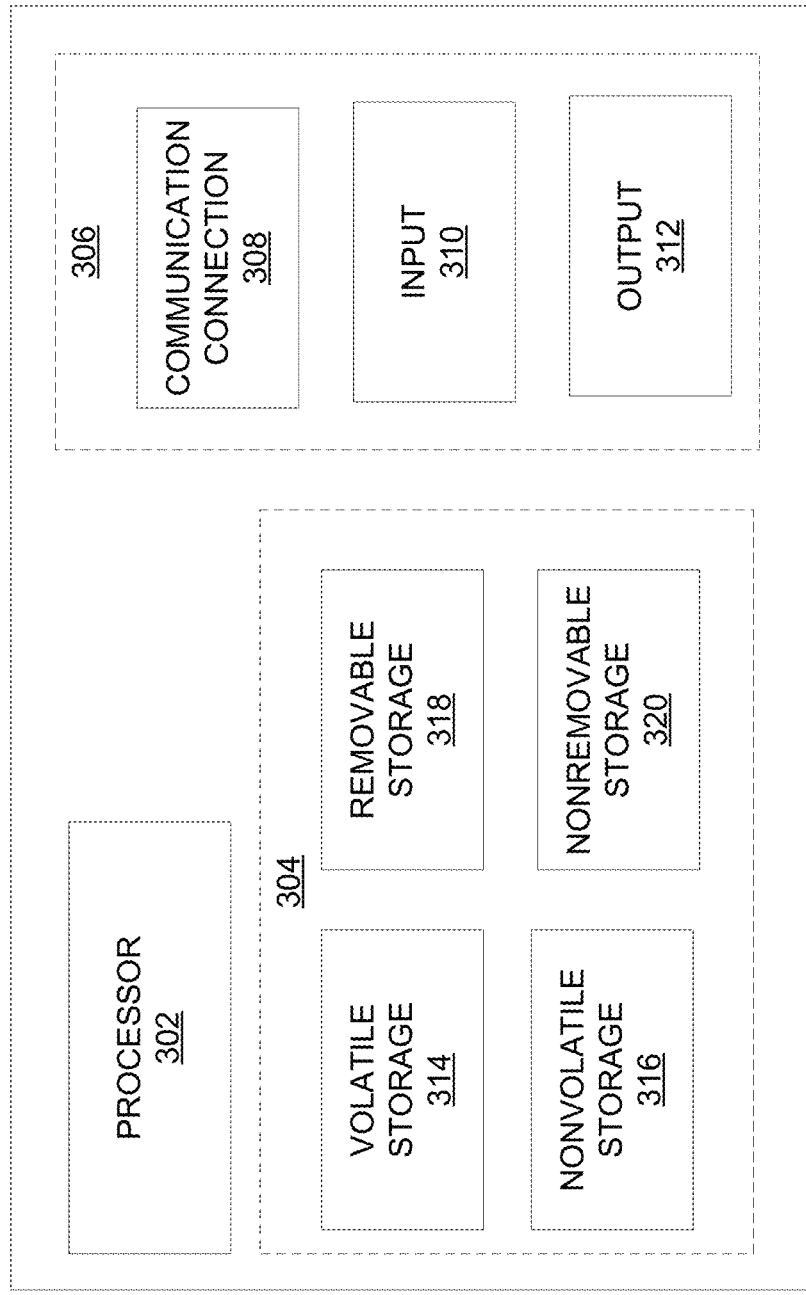
FIG. 8 illustrates a schematic of an exemplary network device.

FIG. 8 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 8 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 8) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 9:
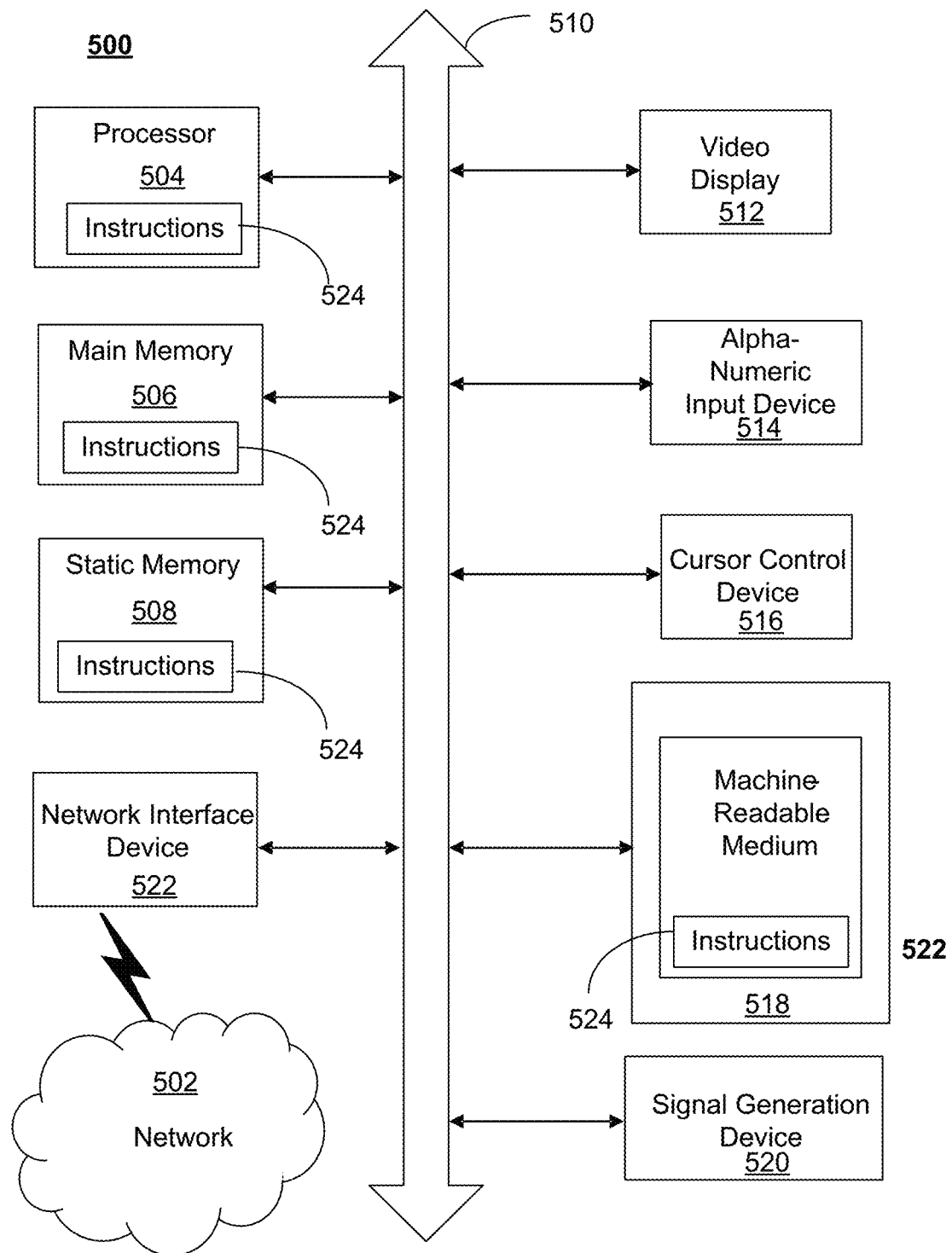
FIG. 9 illustrates an exemplary communication system that provides wireless telecommunication services over wireless communication networks.

FIG. 9 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, server 104, server 102, and other devices of FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 10:
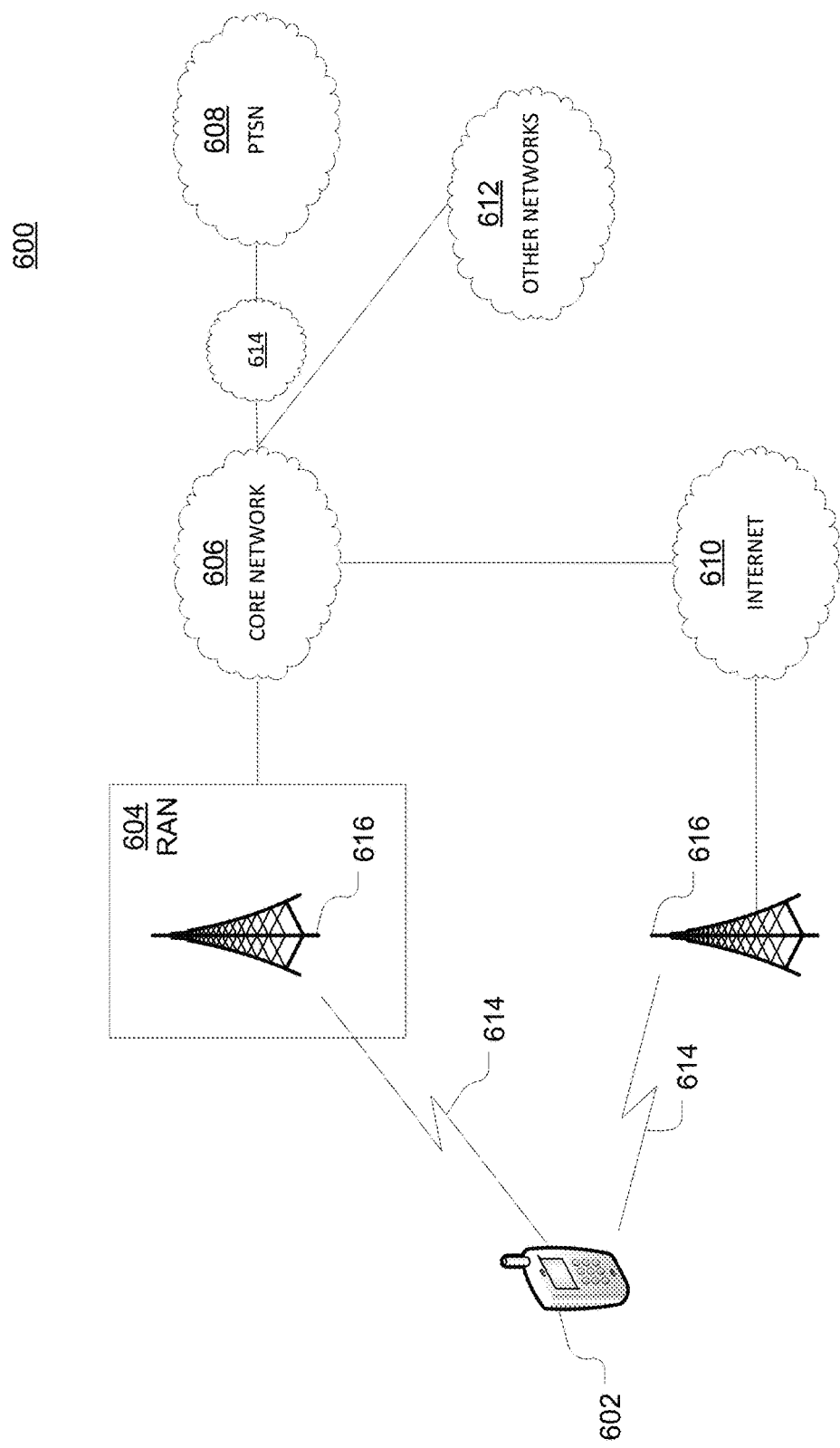
FIG. 10 illustrates an exemplary telecommunications system in which the disclosed methods and processes may be implemented.

As shown in FIG. 10, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may include mobile device 101, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed. Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 10, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 10, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

As described herein, virtual machines (VMs) can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., server 104) a particular VM 105 may be provisioned on any one (or multiple) of the devices included in a cloud environment.

In some instances, a virtual machine manager (not shown) may be provided in connection with a cloud computing system (or other system hosting virtual infrastructure). Virtual machine managers, or hypervisors, may be implemented as software- or hardware-based tools used in the virtualization of hardware assets (e.g., as virtual machines 105) on one or more host computing devices (e.g., server 104). A virtual machine manager may be used to run multiple virtual machines (e.g., 105), including virtual machines with different guest operating systems, on one or more host computers (e.g., server 104). The virtual machine manager may provide a shared virtual operating platform for multiple virtual appliances and guest operating systems and enable a plurality of different virtual machines (and guest operating systems) to be instantiated and run on computing devices and hardware hosting virtual infrastructure (e.g., server 104 or mobile device 101). Further, virtual machine managers, in some instances may be run natively, or as "bare metal," directly on host computing devices' hardware to control the hardware and to manage virtual machines provisioned on the host devices. In other instances, "hosted" virtual machine managers may be provided that is run within the operating system of another host machine, including conventional operating system environments. Although virtual machine is discussed, the methods systems are applicable to applications in one operating system environment. Lastly, virtual component can be programmed to perform application specific functions that may be associated with microcontroller, sensor, motors, actuators, lighting, or radio frequency identification (RFID).

While examples of a telecommunications system in which service level resiliency methods can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—service level resiliency—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

An example apparatus, system, or method may include the following operations: obtaining one or more messages, the one more messages comprising a response time threshold; based on the one or more messages, determining service-level mean time between outages; based on the service-level mean time, determining the mean time between virtual machine outage incidents; and sending an alert when the mean time between virtual machine outage incidents are above a threshold. The messages may include information as disclosed with regard to FIG. 3 or FIG. 4, for example. An alert or instructions to alter a system may be based on thresholds associated with anyone of steps in FIG. 3 or FIG. 4.

What is claimed:

1. An apparatus comprising:
   a processor; and
   a memory coupled with the processor, the memory comprising executable instructions that when executed by the processor cause the processor to effectuate operations comprising:
      obtaining one or more metrics, the one or more metrics comprising a first metric associated with a response time for a service relative to a threshold associated with a fulfillment of a transaction and a second metric associated with an accessibility of the service;
      based on the one or more metrics, determining a time period between virtual machine outage incidents for the service; and
      sending an alert when the time period between virtual machine outage incidents is above a second threshold.

2. The apparatus of claim 1, wherein the one or more metrics further comprise a loss metric.

3. The apparatus of claim 1, wherein the one or more metrics comprise a third metric associated with a transaction arrival rate.

4. The apparatus of claim 1, the operations further comprising determining a mean time to restore the service based on the one or more metrics.

5. The apparatus of claim 1, the operations further comprising determining an average service impact of the virtual machine outage incidents based on the time period between virtual machine outage incidents.

6. The apparatus of claim 1, the operations further comprising determining a mean time to restore the service after virtual machine outages based on the time period between virtual machine outage incidents.

7. The apparatus of claim 1, the operations further comprising determining an average service impact of a network function virtualization infrastructure outage incident based on the time period between virtual machine outage incidents.

8. A method comprising:
   obtaining, by a processor, one or more metrics, the one or more metrics comprising a first metric associated with a response time for a service relative to a threshold associated with a fulfillment of a transaction and a second metric associated with an accessibility of the service;
   based on the one or more metrics, determining, by the processor, a time between virtual machine outage incidents for the service; and
   sending, by the processor, an alert when the time between virtual machine outage incidents is above a second threshold.

9. The method of claim 8, wherein the one or more metrics further comprise a loss metric.

10. The method of claim 8, wherein the one or more metrics comprise a third metric associated with a transaction arrival rate.

11. The method of claim 8, further comprising determining a mean time to restore the service based on the one or more metrics.

12. The method of claim 8, further comprising determining an average service impact of the virtual machine outage incidents based on the time between virtual machine outage incidents.

13. The method of claim 8, further comprising determining a mean time to restore the service after virtual machine outages based on the time between virtual machine outage incidents.

14. A system comprising:
   one or more processors; and
   memory coupled with the one or more processors, the memory comprising executable instructions that when executed by the one or more processors cause the one or more processors to effectuate operations comprising:
      obtaining one or more metrics, the one or more metrics comprising a first metric associated with a response time for a service relative to a threshold associated with a fulfillment of a transaction and a second metric associated with an accessibility of the service;
      based on the one or more metrics, determining a period between virtual machine outage incidents for the service; and
      sending an alert when the period between virtual machine outage incidents is above a second threshold.

15. The system of claim 14, wherein the one or more metrics further comprise a loss metric.

16. The system of claim 14, wherein the one or more metrics comprise a third metric associated with a transaction arrival rate.

17. The system of claim 14, the operations further comprising determining a mean time to restore the service based on the one or more metrics.

18. The system of claim 14, the operations further comprising determining an average service impact of the virtual machine outage incidents based on the period between virtual machine outage incidents.

19. The system of claim 14, the operations further comprising determining an average service impact of a network function virtualization infrastructure outage incident based on the period between virtual machine outage incidents.

20. The system of claim 14, the operations further comprising:
- based on the one or more metrics, determining a service-level mean time between failures for hardware;
- based on the one or more metrics, determining a service-level mean time between failures for software;
- based on the one or more metrics, determining a mean time to restore service for the hardware;
- based on the one or more metrics, determining a mean time to restore service for the software;
- determining an average service impact of a failure based on the service-level mean time between failures for the hardware, the service-level mean time between failures for the software, the mean time to restore service for the hardware, and the mean time to restore service for the software; and
- presenting the average service impact of a failure via a display unit.

* * * * *

UNITED STATES PATENT AND TRADEMARK OFFICE
CERTIFICATE OF CORRECTION

PATENT NO. : 11,394,600 B2
APPLICATION NO. : 17/001206
DATED : July 19, 2022
INVENTOR(S) : Reeser It is certified that error appears in the above-identified patent and that said Letters Patent is hereby corrected as shown below:

In the Specification

Column 17, Line 64, insert --RF,-- before the word "microwave".

Signed and Sealed this
Thirtieth Day of August, 2022

Katherine Kelly Vidal
*Director of the United States Patent and Trademark Office*